ated Aug. 23, 1921.

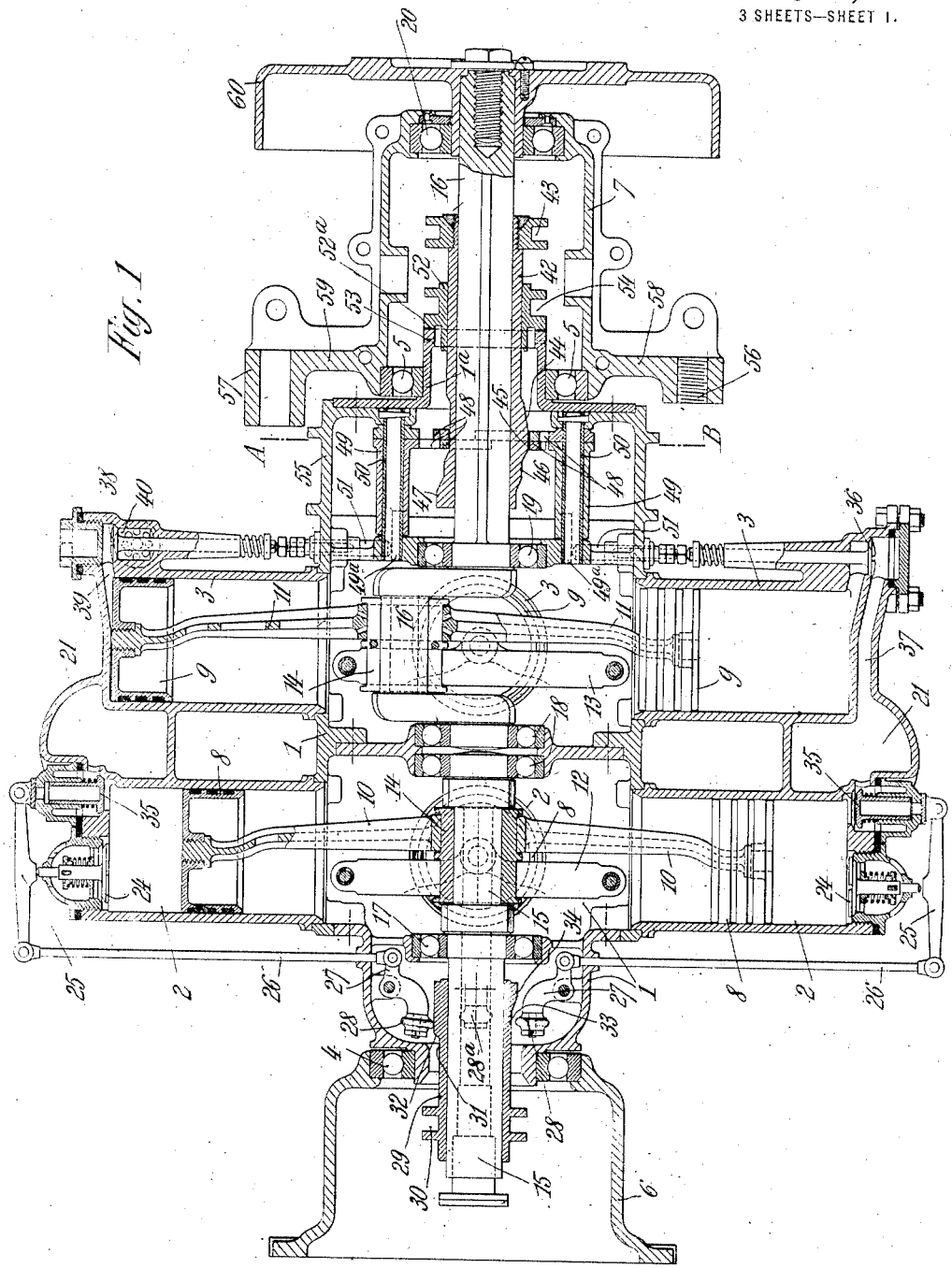

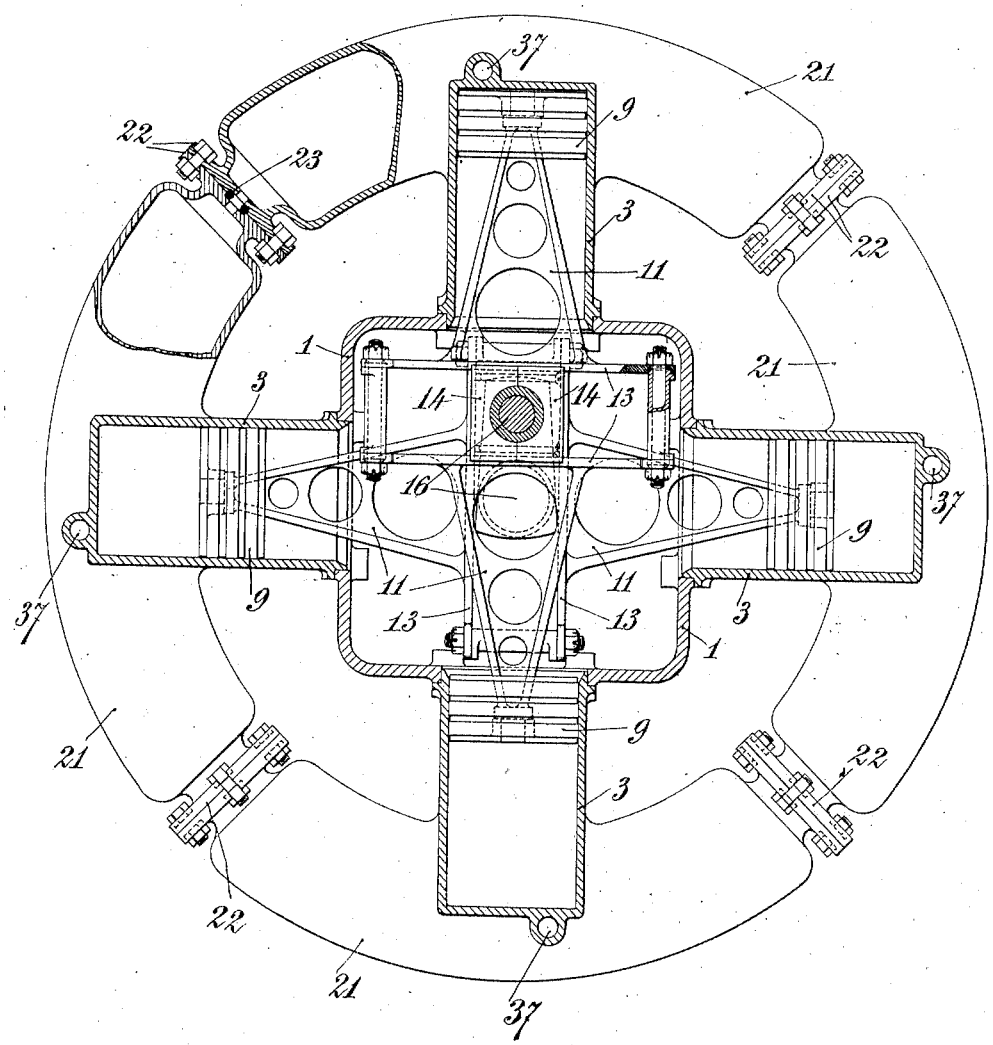

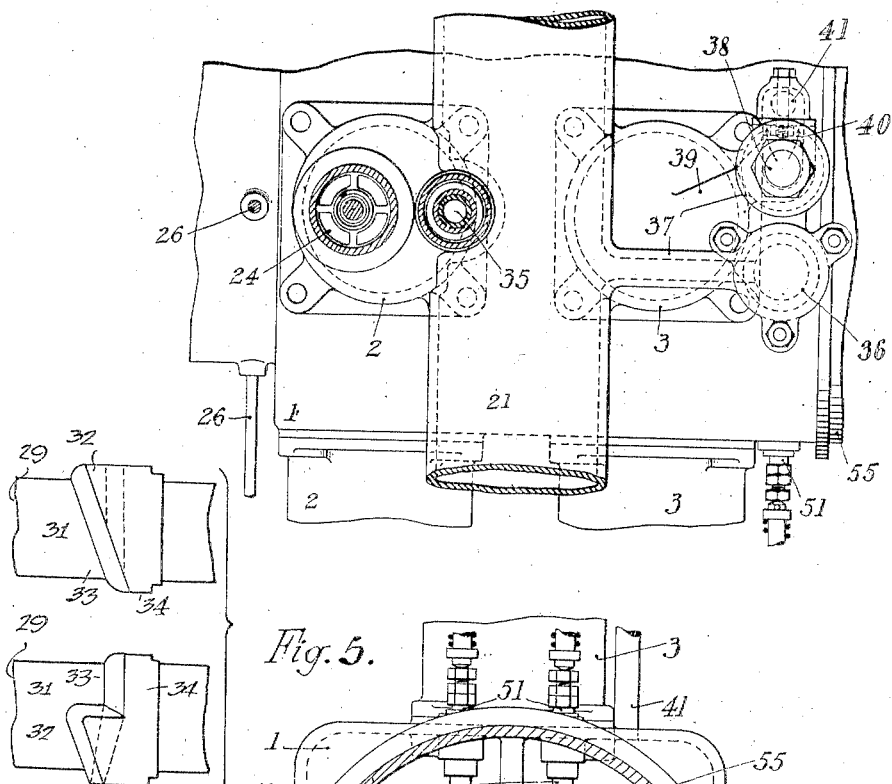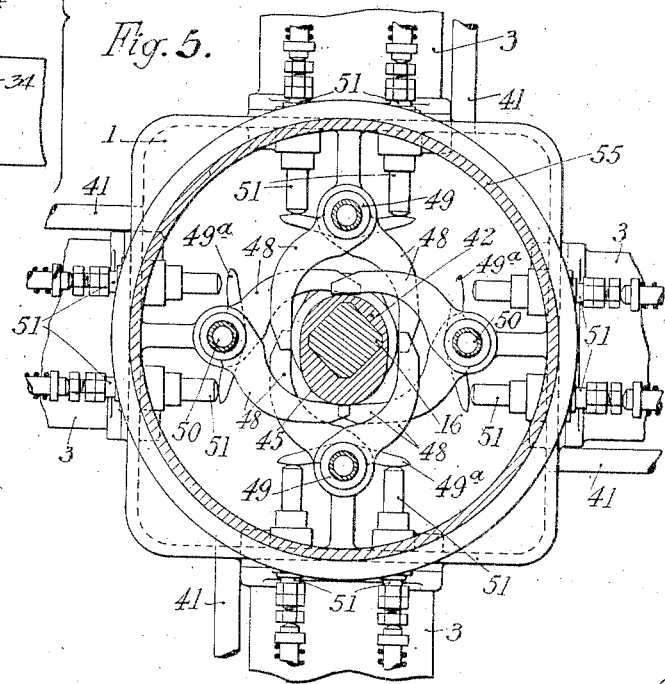

UNITED STATES PATENT OFFICE.

CAMILLE JEAN HAUTIER, OF BOULOGNE, FRANCE.

GYROSCOPIC APPARATUS FOR TRANSMISSION OF POWER.

1,388,464.    Specification of Letters Patent.    Patented Aug. 23, 1921.

Application filed April 12, 1913. Serial No. 760,768.

(GRANTED UNDER THE PROVISIONS OF THE ACT OF MARCH 3, 1921, 41 STAT. L., 1313.)

*To all whom it may concern:*

Be it known that I, CAMILLE JEAN HAUTIER, citizen of the Republic of France, and resident of 53 Rue du Chateau, Boulogne, Seine, in the said Republic, have invented certain new and useful Improvements in Gyroscopic Apparatus for Transmission of Power; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention has for its object, a gyroscopic apparatus for the transmission of power, particularly applicable for rail traction, and generally wherever a driving force of variable torque and for reversing is necessary.

The apparatus comprises two or more pairs of double cylinders, cast in a single piece or rigidly connected together, which are fixed to a common crank case, perpendicular to their crank axes and which allow the latter to turn either separately or together or themselves turn around their axes in the same or opposite direction, or turn at a relative speed or at the same speed as those axes, the whole rotary system thus forming a fly wheel.

The two groups of the gyroscopic system are constituted, one by air compressing cylinders and the other by air engine cylinders. They are connected directly by a duct and suitably controlled by adjustable cams, in a manner adapted to vary the reciprocative action of the two groups with respect to their axes and thus allow any variation of the driving couple on the driven shaft.

The apparatus is particularly suited for locomotives or for all self propelling tractors or vehicles in general, in which the prime motor is a heat engine. When applied to a locomotive or a self propelling explosion motor, it is advantageous to fix to the driven shaft an appropriate reversing gear for allowing the vehicle to travel in either direction absolutely under the same conditions.

Figure 1 of the accompanying designs is a longitudinal section of the gyroscopic apparatus the object of the invention; Fig. 2 is a cross section through the air engine cylinders. Fig. 3 is a partial plan, showing two twin cylinders; Fig. 4 is a detail cross section along line A—B of Fig. 1 and showing the valve gear of the air engine cylinders. Fig. 5 shows different elevations of the controlling cam.

The apparatus is constituted by a crank case 1, of substantially rectangular shape, on which are fixed side by side, by their bases, four compressor cylinders 2 and four working cylinders 3, the axes of which are arranged in pairs mutually perpendicular, the four cylinders of each group being thus fixed at 90° one to another. The crank case is mounted by means of ball bearings 4 and 5, on one side on an extension 6 of the fixed casing of the prime motor, for example a heat engine serving for driving the vehicle, and on the other isde on an extension 7, also fixed, serving for its attachment to the vehicle frame.

In the eight compressor and working cylinders 2 and 3 work respectively pistons 8 and 9 which are rigidly connected to cross heads 10 and 11, on the slides 12 and 13 of which are engaged the brasses 14 of the crank shafts 15 and 16. Shaft 15, which is the driving shaft and is a prolongation of that of the prime motor to which it is rigidly connected, terminates with the compressor, while shaft 16, which is independent of shaft 15 commences where the other terminates and is the driven shaft; the ball bearings 17, 18, 19 and 20 disposed in the division plates of the crank case support shafts 15 and 16. By means of the slides 12 and 13 of the cross heads 10 and 11, the reciprocating movement of the pistons and of the cross heads is transmitted to the crank pins as a rotary movement.

Between the groups of cylinders 2 and 3 is an annular duct 21, preferably in one with the cylinders as shown, or rigid therewith, which serves as an air reservoir intermediate of the compressor and air engine and communicates for this purpose with the delivery valves of the compressor cylinder 2 and the admission valves of the engine cylinders 3. The reservoir 21 is in sections coupled up between the cylinders by means of the flanges 22 Fig. 2 and interposed joint member 23.

Each compressor cylinder has at its end an induction valve 24 communicating with the atmosphere and controlled by a lever 25 actuated by means of a rod 26 articulated to an oscillating lever 27 which carries on its end a roller 28 running on a cam on the compressor. It will be seen in Fig. 1, that the rollers 28ª of the induction valves of two of the compressor cylinders 2 (those situated respectively in front and in rear of the section plane) are slightly out of alinement with respect to the rollers 28 of the valves of the other two cylinders, so as to allow, when desired, the valves of two cylinders fixed at 90° to one another only being operated, in order to obtain a greater degree of pressure. The controlling cam comprises a sleeve 29 which is rotatably fixed on shaft 15, but can be displaced longitudinally, to any desired amount, by means of collars 30 on the sleeve. The cam sleeve has four parts 31, 32, 33 and 34. The part 31 is cylindrical and is of insufficient diameter to engage the rollers 28 and 28ª, so that all of the valves 24 will be free to open and close and all the pumps will be active when said part is in the vertical planes of the rollers. The part 32 consists of a beveled step portion arranged diagonally to the longitudinal axis of the sleeve 29 and extending over half the circumference of the latter, and forming an extension 33 of the part 31 over the other half of the circumference. When the part 32 is in the position shown in Fig. 1 it will engage and raise a roller of each pair of rollers, i. e., one roller 28 and one roller 28ª, while the unstepped portion 33 will not engage the other two rollers 28 and 28ª. By reason of the roller 28ª being out of alinement with the roller 28, and owing to the form of the part 32, it will be seen that when the sleeve 29 is rotated one roller 28 and one roller 28ª will be simultaneously raised and the valves 24 of two cylinders, arranged at 90° to one another, will be opened and these cylinders rendered inactive.

The part 34 is of the same height as the part 32 and extends entirely around the sleeve. When the latter is moved to the left of the position shown in Fig. 1, said part 34 will simultaneously support both pairs of rollers and the valves 24 of the four cylinders remain open so as to place the apparatus out of action or allow it to run light by rendering the pumps inactive. Thus it will be seen that the air inlet valves 24 are not automatic, but are dependent on cam 29 for their control, so that all the pumps may be rendered active, or only two rendered active, or all may be rendered inactive, according to the position of the cam sleeve.

In the end of the compressor cylinders 2 are also mounted the delivery valves 35, here shown as automatic, which open directly to the reservoir 21.

The working cylinders 3 have in their ends both admission valves 36 communicating by means of duct 37 with reservoir 21, and also exhaust valves 38 connected through passage 39 to the cylinder chamber. These exhaust valves open into a chamber 40 which communicate by a pipe 41 with the interior of the crank case 1 (Figs. 1, 3 and 4), so that the expanded air passes into this case before being discharged and deposits there the lubricant which it has been enabled to take up.

The admission valves 36 and the exhaust valves 38 are controlled by a common cam, on the driven shaft 16. This cam, like that of the compressor, consists of a sleeve 42 fixed in angular position on shaft 16 but adapted to be shifted longitudinally by means of a collar 43 thereon. It has four operating parts; the first 44 for the expansion period; the second for going ahead; the third for the stoppage of the operation of the air engine valves; and the fourth for going backward. Around this cam engage four forked members 48 (Figs. 1 and 4) fixed to sleeves 49 which are mounted on shafts 50 (shown hollow) and carrying on their ends fingers 49ª for operating the tappets 51 of the spindles of valves 36 and 38.

On sleeve 42 can slide, but without turning, a muff coupling 52 provided at its end with teeth 52ª for meshing with similar teeth 53 formed on the edge of a disk 1ª closing the end of the crank casing 1. A collar 54 carried by coupling 52 permits of its longitudinal displacement on sleeve 42, to allow the casing to drive the driven shaft.

The case 1, which is square as regards the part carrying the cylinders 2 and 3, is prolonged by a circular part 55 (Fig. 4) forming a drum on which a brake (not shown) can act having its points of articulation at 56 and 57 at the extremity of arms 58 and 59 carried by the fixed extension 7 of the case 1.

On the end of the driven shaft 16 is mounted a brake drum 60, for braking or stopping the shaft 16.

In the application of the system the front extension 6 of the case 1 of the gyroscopic group is adjacent the engine or prime mover, while to the brake drum 60 is connected the power shaft.

The operation of the apparatus is as follows:—

Normally, the prime mover being supposed in motion to rotate the shaft 15, the brake which acts on drum 55 being free, the cams 29 and 42 being in the position shown, the couplings 52, 53 being in mesh, then the action of the piston 8 in the compressor cylinders 2, drives the compressed air into reservoir 21, where the pressure very rapidly attains the desired degree. The air, passing then into cylinders 3, acts on their pistons 9 which, by means of the cross heads 11 move the driven shaft 16 in the direction for going ahead. In this way is obtained direct transmission of motive power to the driven shaft; the case 1 put in motion by the air engine, drives this shaft, owing to the coupling 52, 53, at a speed more or less great according to the resistance offered. At the maximum speed corresponding to the direct drive the whole gyroscopic group turns at the same speed as the prime mover.

To obtain the cessation of the action of the driving couple, the cam 29 of the compressor is placed suddenly into the position for light running (corresponding to actuation by part 34) in order that there may be instantaneously a fall of gaseous pressure on the compressor pistons, since the valves 24 are then kept open continuously by the cam.

For moving backward, cam 42 of the air engine is placed in the corresponding position, the brake is kept to the drum 55 and coupling 52, 53 is unclutched in order that compressed air from compressor cylinders 2 may act on pistons 9 of the working cylinders 3 and by reason of appropriate reversal of the distribution produced by the cam, thus turn the driven shaft 16 in the direction for back movement, at a speed corresponding to the resistance offered.

Forward travel can also be obtained, in the same manner as the back travel, by retaining the drum 55 braked and disengaging the clutch 52, 53, the cam 42 of the air engine being in the position for forward travel (for actuation by the part 45); air from the compressor flows directly to the air engine whose pistons 9 drive the shaft 16.

For forward travel, the air engine can also operate by expansion, by using the part 44 of the cam, if it is desired to increase again the power of the pneumatic transmission.

If, the prime mover be at rest, and it is desired to start by means of the air engine, cam 29 is put into the third position (for the part 31 to operate) and cam 42 into the position of rear movement, the brake is withdrawn from drum 55 and coupling 52, 53 uncoupled; the pressure of the air from reservoir 21 turns the air engine which carries with it the case 1 and the whole gyroscopic group, valves 24 of the compressor remaining on their seats; pistons 8 of the compressor thus drive the shaft 15 and start the prime mover.

The prime mover operating lightly at constant speed, if one wishes to start the vehicle, the brake is kept off, coupling 52, 53 connected up, and cam 29 of the compressor is put into its normal position (for the part 33 to operate) and cam 42 of the air engine into the position for forward travel (the position shown on the drawing) in order that there may be instantly produced a pressure on the pistons 9, in a manner to operate, at relative speed, the crank 16. Automatically, without any action on the part of the driver, the acceleration of the vehicle is produced and will attain the highest possible speed, corresponding to an absolute equilibrium of the compressor couple, of the air engine reaction couple and resisting couple. This acceleration will increase or decrease automatically according to the profile of the path traversed and will attain its greatest speed, on a suitable profile, the whole gyroscopic group turning at this moment at the speed of the driving shaft 15, thus constituting a flywheel.

One can, for example at starting off or in the case of a slope, produce an increase in the pressure of the compressed air by working two of the compressor cylinders only, by displacing cam 29 of the compressor in a manner to cause part 32 to operate.

As has been indicated, the adjustments of cam 42 of the air engine, of the brake drum 55 and of the coupling 52, 53, are effected simultaneously by means of a single control which brings about the forward or rear travel very simply.

The lubricating of the apparatus is assured by a quantity of oil introduced into the case 1; this oil forced by the compressor into the air engine return to the case, as has been explained, by pipes 41 after lubricating the whole system.

The system thus allows of the following results being obtained:—

The automatic starting of the prime mover by the gyroscopic group after a prior compression; operation for the light running of the prime mover when desired; operation of only a portion of the compressor cylinders, for the purpose of obtaining a higher pressure, facilitating starting or running up hill; operation of all the compressor cylinders for obtaining a pressure for normal travel; complete or partial transformation of the motive power according to the power required; direct transmission of force without transformation of motive power; and gradual and pneumatic starting and automatic acceleration of speed, with any action and proportionally to the resisting couple, up to direct drive.

I claim:—

1. In a power transmission, the combination with a driving shaft, of a rotatable air pump driven by said shaft, a rotatable air driven engine, a driven shaft operated by said engine an air reservoir included between the pump and engine, said engine, pump and reservoir rotating as a unit, and means to partially unload the pump including means to render it inactive.

2. A gyroscopic apparatus for transmission of power which comprises:—a group of radiating compressor cylinders, a group of radiating working cylinders connected rigidly to the compressor cylinders; pistons in all the cylinders; a common rotary crank case, on which are mounted the two groups of cylinders, a crank shaft arranged in the interior of the case and perpendicular to the planes of the two groups of cylinders; connecting members between the shaft and the several pistons, induction valves for the compressor cylinders, a multiple cam, movable in the crank shaft, for controlling these valves, a first projection on this cam adapted to cause the complete closure of all the valves, a second projection adapted to operate only a portion of the valves, a third projection adapted to operate in succession all the valves of the group, a fourth projection on the cam adapted for retaining the whole of the said valves in raised position, automatic exhaust valves for the compressor cylinders and means for conducting to the working cylinders the compressed fluid issuing through the exhaust valves.

3. A gyroscopic apparatus for transmission of power which comprises:—a group of radiating compressor cylinders, a group of radiating working cylinders, connected rigidly to the compressor cylinders; pistons in all the cylinders; a common rotary crank case, on which are mounted the two groups of cylinders, a crank shaft arranged in the interior of the case and perpendicular to the planes of the two groups of cylinders; connecting members between the shaft and the several pistons, means for conducting to the working cylinders the compressed fluid from the compressor cylinders, admission and exhaust valves for the working cylinders, a movable cam, mounted on the crank shaft a system of levers and oscillating rods arranged around the cam for controlling simultaneously the said admission and exhaust valves.

4. In a power transmission, a driving shaft, a rotatable air pump comprising a piston and cylinder actuated by said shaft, a mechanically actuated air inlet valve for said cylinder, controlling means for said valve to open the valve at intervals or to hold the valve continually open, or to permit it to be maintained closed, a rotatable air engine, a driven shaft actuated by said engine, and an air reservoir between the pump and engine, said engine, reservoir and pump rotatable as a unit.

5. A gyroscopic apparatus for transmission of power which comprises a rotary crank case, a crank shaft within the case, two groups of connected compressor and working cylinders, fixed on the case perpendicular to the shaft, means for conducting to the working cylinders compressed fluid from the compressor cylinders, rigid alternately moving cross heads which connect to the crank shaft opposing pistons of each of the two groups, and sliding members on the pins of the shaft for the sliding of the cross heads.

6. In a power transmission, the combination with a driving shaft, of a rotatable air pump driven by said shaft, a rotatable air driven engine, a driven shaft operated by said engine and an air reservoir included between the pump and engine, said engine, pump and reservoir rotating as a unit, means to hold the unit stationary at will, and means to partially unload the pump including means to render it inactive.

7. A gyroscopic power transmission device comprising a driving shaft, a driven shaft, a group of revoluble compressor pistons and cylinders for the driving shaft, a group of revoluble pistons and cylinders for said driven shaft, a casing common to both groups, means revoluble with said cylinders for receiving compressed air from the compressor and delivering it to the working cylinders and means to control the number of compressor pistons in action.

8. A gyroscopic power transmission device, comprising a driving shaft, a group of compressor pistons and cylinders for said shaft, a driven shaft, a group of working pistons and cylinders for said shaft, an air reservoir between the groups of cylinders, means to rotatably support said assemblage of cylinders and reservoir, means to brake the assemblage, and means to connect and disconnect the assemblage from the driven shaft, means to vary the number of compressor pistons and cylinders in action, and means to reverse the operation of the working pistons.

In testimony that I claim the foregoing as my invention, I have signed my name in presence of two subscribing witnesses.

CAMILLE JEAN HAUTIER.

Witnesses:
HANSON C. COXE,
ALCIDE FABE.